United States Patent
Lucas

(10) Patent No.: US 10,674,749 B2
(45) Date of Patent: Jun. 9, 2020

(54) SYSTEM AND METHOD FOR DEAERATING BEVERAGES

(71) Applicant: BEVCORP LLC, Willoughby, OH (US)

(72) Inventor: Lawrence M. Lucas, Dallas, GA (US)

(73) Assignee: BEVCORP LLC, Willoughby, OH (US)

( * ) Notice: Subject to any disclaimer, the term of this patent is extended or adjusted under 35 U.S.C. 154(b) by 199 days.

(21) Appl. No.: 15/659,586

(22) Filed: Jul. 25, 2017

(65) Prior Publication Data

US 2018/0020700 A1    Jan. 25, 2018

Related U.S. Application Data

(60) Provisional application No. 62/366,590, filed on Jul. 25, 2016.

(51) Int. Cl.
*A23L 2/54*     (2006.01)
*B01F 3/04*     (2006.01)
(Continued)

(52) U.S. Cl.
CPC ............. *A23L 2/54* (2013.01); *A23L 2/76* (2013.01); *B01F 3/04787* (2013.01);
(Continued)

(58) Field of Classification Search
CPC .... C02D 1/02; C02D 1/04; B67C 3/10; B67C 3/2614; B47C 3/225; B01F 13/065;
(Continued)

(56) References Cited

U.S. PATENT DOCUMENTS 487,342 A    12/1892    Witteman
2,227,101 A    12/1940    Meyer
(Continued)

FOREIGN PATENT DOCUMENTS

DE    1692739 A1    3/1972
DE    2419353 A1    12/1974
(Continued)

OTHER PUBLICATIONS

Carroll John J. et al., The Solubility of Carbon Dioxide in Water at Low Pressure, J. Phys. Chem. Ref. Data, vol. 20, No. 6, pp. 1201-1209 (1991).
(Continued)

*Primary Examiner* — Hong T Yoo
(74) *Attorney, Agent, or Firm* — Porter Wright Morris & Arthur LLP

(57) ABSTRACT

A method of producing a carbonated beverage comprising a blend of water and syrup having a predetermined final carbonation level. The method includes the steps of: introducing $CO_2$ into a flowing stream of a product blend comprising water, syrup and dissolved oxygen, such that $CO_2$ is dissolved in the product blend; deaerating the $CO_2$-containing product blend by introducing the blend into a vented atmospheric vessel, the interior of which is at ambient pressure with a headspace maintained above the surface of the liquid within the vessel, whereby dissolved oxygen is released from the product blend and vented from the vessel; pumping the deaerated product blend from the vessel, wherein the deaerated blend includes dissolved $CO_2$ at an intermediate carbonation level less than the final carbonation level; and carbonating the deaerated product blend to the final carbonation level downstream of the vented vessel to produce a carbonated beverage for subsequent packaging. A system for performing the method is also provided, as well as a method of producing a beverage using nitrogen deaeration.

19 Claims, 4 Drawing Sheets

(51) Int. Cl.
*B01F 5/04* (2006.01)
*A23L 2/76* (2006.01)
*B01F 3/20* (2006.01)
*B01F 3/22* (2006.01)

(52) U.S. Cl.
CPC ...... *B01F 3/04808* (2013.01); *B01F 3/04815* (2013.01); *B01F 3/2021* (2013.01); *B01F 3/2223* (2013.01); *B01F 5/0465* (2013.01); *B01F 2003/049* (2013.01); *B01F 2003/04893* (2013.01)

(58) Field of Classification Search
CPC ...... B01F 15/00155; B01F 2003/04879; B01F 2215/0022; B01F 3/04468; B01F 3/04496; B01F 3/04808; B01F 3/04; A23L 2/54; A23L 2/76
See application file for complete search history.

(56) References Cited

U.S. PATENT DOCUMENTS

| | | | |
|---|---|---|---|
| 2,457,903 A | 1/1949 | Kantor et al. | |
| 3,113,871 A | 12/1963 | Webster | |
| 3,233,779 A | 2/1966 | Corneluis | |
| 3,256,802 A | 6/1966 | Karr | |
| 3,522,055 A | 7/1970 | Hayakawa | |
| 3,877,358 A | 4/1975 | Karr | |
| 3,960,066 A | 6/1976 | Larocco et al. | |
| 4,112,828 A | 9/1978 | Mojonnier et al. | |
| 4,205,599 A | 6/1980 | Franzosi | |
| 4,259,360 A | 3/1981 | Venetucci et al. | |
| 4,300,923 A | 11/1981 | Skoli et al. | |
| 4,350,503 A | 9/1982 | Skoli et al. | |
| 4,352,679 A | 10/1982 | Notardonato et al. | |
| 4,352,682 A | 10/1982 | Kemp, Jr. et al. | |
| 4,599,239 A | 7/1986 | Wieland et al. | |
| 4,766,001 A | 8/1988 | Mizandjian et al. | |
| 4,801,471 A | 1/1989 | Mojonnier | |
| 5,068,116 A | 11/1991 | Gibney et al. | |
| 5,080,802 A | 1/1992 | Cairo, Jr. et al. | |
| 5,112,357 A | 5/1992 | Bjerklund et al. | |
| 5,314,703 A | 5/1994 | Gibney et al. | |
| 5,537,914 A | 7/1996 | Gibney et al. | |
| 5,585,128 A | 12/1996 | Benedict et al. | |
| 5,656,313 A | 8/1997 | Gibney et al. | |
| 6,355,292 B1 | 3/2002 | Cheng et al. | |
| 6,981,997 B2 | 1/2006 | Williams et al. | |
| 7,041,327 B2 | 5/2006 | Hotchkiss et al. | |
| 7,125,438 B2 | 10/2006 | Skoglund et al. | |
| 2010/0040751 A1 | 2/2010 | Yamada | |
| 2015/0122126 A1 | 5/2015 | Lanzingh | |

FOREIGN PATENT DOCUMENTS

| | | |
|---|---|---|
| DE | 2818236 A1 | 11/1979 |
| DE | 3132706 A1 | 3/1983 |
| DE | 3334824 A1 | 4/1985 |
| DE | 3634814 A1 | 6/1987 |
| EP | 0645168 B1 | 6/1997 |
| GB | 557186 A | 11/1943 |

OTHER PUBLICATIONS

Dharmadhikari, Murli, Use of Inert Gases, Available: https://www.extension.iastate.edu/wine/use-inert-gases; available since at least 2012.

International Search Report and Written Opinion dated Oct. 13, 2017 from corresponding International Application No. PCT/US17/43811.

FIG. 1

CO2 SOLUBILITY TABLE (VOLUMES CO2 PER VOLUME OF BEVERAGE)

PRESSURE (PSIG)

| TEMPERATURE (°F) | 0 | 2 | 4 | 6 | 8 | 10 | 12 | 14 | 16 | 18 |
|---|---|---|---|---|---|---|---|---|---|---|
| 40° | 1.45 | 1.6 | 1.8 | 2.0 | 2.2 | 2.4 | 2.6 | 2.8 | 3.0 | 3.2 |
| 41 | 1.42 | 1.6 | 1.8 | 2.0 | 2.2 | 2.4 | 2.6 | 2.8 | 2.9 | 3.1 |
| 42 | 1.40 | 1.6 | 1.8 | 2.0 | 2.1 | 2.3 | 2.6 | 2.8 | 2.9 | 3.1 |
| 43 | 1.37 | 1.6 | 1.7 | 1.9 | 2.1 | 2.3 | 2.5 | 2.7 | 2.8 | 3.0 |
| 44 | 1.35 | 1.5 | 1.7 | 1.9 | 2.1 | 2.2 | 2.4 | 2.6 | 2.8 | 3.0 |
| 45 | 1.32 | 1.5 | 1.7 | 1.8 | 2.0 | 2.2 | 2.4 | 2.5 | 2.7 | 2.9 |
| 46 | 1.29 | 1.5 | 1.6 | 1.8 | 2.0 | 2.2 | 2.3 | 2.5 | 2.7 | 2.8 |
| 47 | 1.26 | 1.4 | 1.6 | 1.8 | 1.9 | 2.1 | 2.3 | 2.4 | 2.6 | 2.8 |
| 48 | 1.24 | 1.4 | 1.6 | 1.7 | 1.9 | 2.1 | 2.2 | 2.4 | 2.6 | 2.7 |
| 49 | 1.21 | 1.4 | 1.5 | 1.7 | 1.9 | 2.0 | 2.2 | 2.4 | 2.5 | 2.7 |
| 50° | 1.19 | 1.4 | 1.5 | 1.7 | 1.8 | 2.0 | 2.2 | 2.3 | 2.5 | 2.6 |
| 51 | 1.17 | 1.3 | 1.5 | 1.6 | 1.8 | 2.0 | 2.1 | 2.3 | 2.4 | 2.6 |
| 52 | 1.15 | 1.3 | 1.5 | 1.6 | 1.8 | 1.9 | 2.1 | 2.2 | 2.4 | 2.5 |
| 53 | 1.13 | 1.3 | 1.4 | 1.6 | 1.7 | 1.9 | 2.0 | 2.2 | 2.3 | 2.5 |
| 54 | 1.11 | 1.3 | 1.4 | 1.6 | 1.7 | 1.9 | 2.0 | 2.2 | 2.3 | 2.4 |
| 55 | 1.10 | 1.2 | 1.4 | 1.5 | 1.7 | 1.8 | 2.0 | 2.1 | 2.3 | 2.4 |
| 56 | 1.08 | 1.2 | 1.4 | 1.5 | 1.6 | 1.8 | 1.9 | 2.1 | 2.2 | 2.4 |
| 57 | 1.06 | 1.2 | 1.3 | 1.5 | 1.6 | 1.8 | 1.9 | 2.0 | 2.2 | 2.3 |
| 58 | 1.04 | 1.2 | 1.3 | 1.5 | 1.6 | 1.7 | 1.9 | 2.0 | 2.1 | 2.3 |
| 59 | 1.02 | 1.2 | 1.3 | 1.4 | 1.6 | 1.7 | 1.8 | 2.0 | 2.1 | 2.2 |
| 60° | 1.00 | 1.1 | 1.3 | 1.4 | 1.5 | 1.7 | 1.8 | 1.9 | 2.1 | 2.2 |
| 61 | 0.98 | 1.1 | 1.2 | 1.4 | 1.5 | 1.6 | 1.8 | 1.9 | 2.0 | 2.2 |
| 62 | 0.97 | 1.1 | 1.2 | 1.4 | 1.5 | 1.6 | 1.7 | 1.9 | 2.0 | 2.1 |
| 63 | 0.95 | 1.1 | 1.2 | 1.3 | 1.5 | 1.6 | 1.7 | 1.8 | 2.0 | 2.1 |
| 64 | 0.93 | 1.1 | 1.2 | 1.3 | 1.4 | 1.6 | 1.7 | 1.8 | 1.9 | 2.1 |
| 65 | 0.92 | 1.1 | 1.2 | 1.3 | 1.4 | 1.5 | 1.7 | 1.8 | 1.9 | 2.0 |
| 66 | 0.90 | 1.0 | 1.2 | 1.3 | 1.4 | 1.5 | 1.6 | 1.8 | 1.9 | 2.0 |
| 67 | 0.89 | 1.0 | 1.1 | 1.2 | 1.4 | 1.5 | 1.6 | 1.7 | 1.8 | 2.0 |
| 68 | 0.88 | 1.0 | 1.1 | 1.2 | 1.3 | 1.5 | 1.6 | 1.7 | 1.8 | 1.9 |
| 69 | 0.86 | 1.0 | 1.1 | 1.2 | 1.3 | 1.4 | 1.5 | 1.6 | 1.8 | 1.9 |
| 70° | 0.85 | 1.0 | 1.1 | 1.2 | 1.3 | 1.4 | 1.5 | 1.6 | 1.7 | 1.9 |
| 71 | 0.84 | 0.9 | 1.1 | 1.2 | 1.3 | 1.4 | 1.5 | 1.6 | 1.7 | 1.8 |
| 72 | 0.83 | 0.9 | 1.0 | 1.2 | 1.3 | 1.4 | 1.5 | 1.6 | 1.7 | 1.8 |
| 73 | 0.81 | 0.9 | 1.0 | 1.1 | 1.2 | 1.4 | 1.5 | 1.6 | 1.7 | 1.8 |
| 74 | 0.79 | 0.9 | 1.0 | 1.1 | 1.2 | 1.3 | 1.4 | 1.5 | 1.6 | 1.8 |
| 75 | 0.78 | 0.9 | 1.0 | 1.1 | 1.2 | 1.3 | 1.4 | 1.5 | 1.6 | 1.7 |
| 76 | 0.77 | 0.9 | 1.0 | 1.1 | 1.2 | 1.3 | 1.4 | 1.5 | 1.6 | 1.7 |
| 77 | 0.76 | 0.9 | 1.0 | 1.1 | 1.2 | 1.3 | 1.4 | 1.5 | 1.6 | 1.7 |
| 78 | 0.75 | 0.9 | 0.9 | 1.0 | 1.1 | 1.2 | 1.3 | 1.4 | 1.5 | 1.6 |
| 79 | 0.75 | 0.8 | 0.9 | 1.0 | 1.1 | 1.2 | 1.3 | 1.4 | 1.5 | 1.6 |
| 80° | 0.73 | 0.8 | 0.9 | 1.0 | 1.1 | 1.2 | 1.3 | 1.4 | 1.5 | 1.6 |

FIG. 1A

SYSTEM AND METHOD FOR DEAERATING BEVERAGES

CROSS REFERENCE TO RELATED APPLICATIONS

This application claims priority to U.S. Provisional Patent Application No. 62/366,590, filed on Jul. 25, 2016, entitled "SYSTEM AND METHOD FOR DEAERATING BEVERAGES." The entire disclosure of the foregoing provisional patent application is incorporated by reference herein.

BACKGROUND

Beverages are typically packaged into cans, bottles (glass or plastic) and other containers using high speed blending and filling systems. Various product components (e.g., water and a syrup) are blended together in precisely controlled amounts to provide a "product blend" that is subsequently filled into containers. Carbonated beverages such as soft drinks further include a carbonation step between the blending and filling stages, wherein $CO_2$ is dissolved into the beverage. These processes are usually performed at high speeds, requiring precise control of various process parameters such that even a small deviation in one process condition can reduce throughput or result in deleterious effects on the process and/or the packaged beverage.

For example, levels of air (as dissolved oxygen and nitrogen) within the product blend generally should be as low as possible. If the levels of dissolved oxygen and/or nitrogen are too high, excessive foaming will occur during filling—especially with carbonated beverages. This not only results in excessive product loss and short fills, but also typically requires slower line speeds and/or filling at reduced temperatures in an attempt to limit foaming caused by air in the product blend.

In addition to causing foaming during container filling, dissolved air can be problematic after packaging. For example, high levels of oxygen can cause corrosion of the container (particularly metal cans) as well as product degradation, thereby reducing the shelf life of the packaged beverage.

In a typical beverage, e.g., a carbonated beverage such as a soft drink, "syrup" is blended with process water according to product specifications to provide a product blend. If appropriate for the particular beverage being produced, the product blend is then carbonated prior to filing containers. As used herein, the term "syrup" means any concentrated flavoring composition that is combined with water to form a potable beverage. Syrups, particularly those used in the production of soft drinks, are typically of a higher viscosity than water. Syrups generally include a small amount of water to facilitate manufacture of the syrup, as well as blending (e.g., so the syrup can be metered and delivered to a blending stage for blending with process water). Syrups are typically mixtures of several ingredients, including one or more flavoring components, sweeteners (e.g., sugar) and other functional additives. In other instances, the syrup for a particular beverage comprises only a flavoring component(s) and water.

In filling beverages into containers such as cans or bottles, containers are conveyed to a filling machine where the product blend is dispensed into individual containers that are then sealed (e.g., a lid or cap is joined to the filled container). The product blend is delivered into the container at a relatively high pressure (e.g., 50 to 70 psig, or 1.5 to 2 times the saturation pressure for the targeted $CO_2$ volumes of a carbonated beverage at the filling temperature). These high pressures not only maintain the $CO_2$ in solution (i.e., dissolved), but also any air that is present in the product blend. The container is then vented to atmosphere just prior to being sealed closed (e.g., by capping in the case of bottles, or by seaming a metal lid onto cans). High-speed filling machines—especially when dispensing carbonated beverages—typically produce some amount of foam when the filled, pressurized container is vented. Foam is produced by the release of air (dissolved oxygen and nitrogen) that is present in the product blend. The pressure drop from venting causes the dissolved air to come out of solution. When too much oxygen and/or nitrogen is present in the product blend, excessive foaming will occur. This results in spillage (i.e., product loss) and incomplete filling ("short fill") of the container. In order to reduce foaming, manufacturers typically will reduce the filling rate in order to limit agitation of the product (thereby slowing the entire production process) and/or run their filling system at lower temperatures (since the solubility of oxygen and nitrogen in the product blend increases as the temperature decreases).

Foaming can be especially problematic in the packaging of carbonated beverages. After blending of process water and syrup according to predetermined product specifications (i.e., a product recipe), the product blend is carbonated prior to bottling. Carbonation provides fizz (bubbles) that many consumers enjoy, as well as enhanced flavor (the carbon dioxide forms carbonic acid, which counteracts the sweetness of the soft drink). The level of carbonation is dependent upon the product recipe, which specifies the desired carbonation level for that product. Carbonation levels can vary significantly from one product to another, with beverages being produced at higher and higher carbonation levels. These higher carbonation levels result in even more foaming, as the higher amount of $CO_2$ in solution will force out even more air which in turn causes additional agitation of a product that is more volatile (due to the increased level of $CO_2$).

In order to reduce foaming as well as other problems resulting from too much air in the product blend, the process water is typically deaerated prior to being blended with syrup in order to reduce the levels of dissolved oxygen and nitrogen in the water. Process water is usually deaerated by vacuum deaeration or membrane deaeration, with the oxygen level typically reduced to 0.7 to 1.5 ppm and the nitrogen level typically reduced to 1.5 to 3 ppm before the process water is blended with syrup to form the product blend.

Although syrups also contain dissolved oxygen and nitrogen, deaerating syrup is problematic. For example, vacuum deaeration of the syrup is usually not feasible since it will result in significant losses of syrup components, especially more volatile components such as flavoring agents. In addition, since most syrups are highly concentrated, they tend to have a high viscosity, which is incompatible with conventional deaeration processes. Deaerating syrups also results in excessive foaming. In addition, the highly concentrated nature of syrups means that extensive and time-consuming cleaning of deaeration equipment would be necessary in order to remove residual flavoring agents and other syrup components between runs of different products. Because of these and other issues, typically only the process water used in final blending is deaerated in beverage manufacturing. However, syrups can have as much as 6-12 ppm of dissolved oxygen and up to 20 ppm dissolved nitrogen, and the addition of the process water introduces even more air into the product blend prior to packaging. Thus, even when produced with deaerated process water, product blends typically contain 1.5 to 2.5 ppm oxygen and 2 to 5 ppm nitrogen prior to carbonation.

As noted previously, excessive foaming is particularly problematic when bottling carbonated beverages. Carbonation is measured in volumes: a relative measurement of the volume of $CO_2$ that is dissolved in one volume of the carbonated product. In this measurement, the "volume" of dissolved $CO_2$ is the volume that dissolved gas would occupy at atmospheric pressure (1 atm) and 0° C. For example, 4 volumes of $CO_2$ correlates to 4 liters of $CO_2$ dissolved in one liter of carbonated product. The amount of $CO_2$ that can be dissolved in a given quantity of liquid (i.e., $CO_2$ solubility) depends not only on the nature of that liquid, but also its temperature and the partial pressure of $CO_2$ in the gaseous atmosphere in contact with the liquid (i.e., Henry's Law). This relationship allows one to determine how much $CO_2$ can be maintained in solution in a given liquid at a particular temperature and pressure, using a predetermined $CO_2$ solubility table such as shown in FIG. 1 (or other predetermined data set or mathematical approximation). It should be noted that the $CO_2$ solubility table in FIG. 1 is for water. However, such tables are sufficient for use in carbonating most beverages, and their use is standard in the beverage industry.

From the predetermined carbonation level for a particular product, the required saturation pressure (i.e., the $CO_2$ pressure above the liquid that is required dissolve and maintain a specified amount of $CO_2$ in solution) can be calculated from a chart similar to FIG. 1 (or other predetermined data set or mathematical approximation) for any given temperature. Such a table or other data set or mathematical approximation indicates the amount of pressure (as $CO_2$) required to keep the $CO_2$ absorbed in the liquid relative to the temperature of the product for various carbonation levels. As shown by the chart of FIG. 1, a greater volume of $CO_2$ gas will dissolve in a cold liquid under high pressure. It is also well known that oxygen and nitrogen are significantly less soluble than $CO_2$ in water. At 20° C. and one atmosphere, for example, the solubility of oxygen in water is about 2% that of $CO_2$, and the solubility of nitrogen in water is about 1% that of $CO_2$. This same relationship is true in water-based beverages comprising process water blended with syrup (wherein the volume of process water in the blend is significantly greater than the volume of syrup), such as soft drinks.

Existing processes for carbonating beverages typically operate at pressures from 35 to 80 psig in order to allow for complete absorption of the desired volume of $CO_2$ gas (as specified for the product). The carbonated product is stored in a pressurized (with $CO_2$) product tank for distribution to the filling equipment. The pressure at which the carbonated product is stored is generally greater than the saturation pressure requirement for the product with the specified carbonation level in order to maintain the $CO_2$ dissolved in the product blend even if there are temperature variations. Typically, carbonated beverage product storage tanks operate at 1.5 to 2 times the calculated saturation pressure in order to not only maintain the $CO_2$ in solution, but also to assist in the filling process. Also, the carbonated product is usually stored for only a few minutes prior to filling, and therefore any additional carbonation absorbed from the headspace in the storage tank is minimal.

Due to the operating pressures used in the carbonation process in order to meet product specifications as well as the increased pressure required by the filling equipment, oxygen and nitrogen are retained in the product blend during carbonation. However, when the pressure drops during post-fill venting prior to sealing, the oxygen and nitrogen dissolved in the product are released, thereby producing foam.

While a variety of systems and methods may exist for deaerating beverages prior to packaging, it is believed that no one prior to the inventors have made or used an invention as described herein.

BRIEF DESCRIPTION OF THE DRAWINGS

While the specification concludes with claims particularly pointing out and distinctly claiming the invention, it is believed that the invention will be better understood from the detailed description of certain embodiments thereof when read in conjunction with the accompanying drawings. Unless the context indicates otherwise, like numerals are used in the drawings to identify similar elements in the drawings. In addition, some of the figures may have been simplified by the omission of certain elements in order to more clearly show other elements. Such omissions are not necessarily indicative of the presence or absence of particular elements in any of the exemplary embodiments, except as may be explicitly stated in the corresponding detailed description.

FIG. 1 depicts a carbon dioxide saturation table, indicating the volumes of $CO_2$ that can be dissolved in one volume of water-based beverage at the indicated pressure and temperature (i.e., the solubility of $CO_2$ in water or a water-based beverage at a given temperature and pressure). Also referred to as a carbonation volume test chart, the table of FIG. 1 provides the required pressure to dissolve a given volume of carbon dioxide at a given temperature. Likewise, the table of FIG. 1 indicates the amount of pressure required to keep the $CO_2$ absorbed in the liquid relative to the temperature of the product for various carbonation levels. It should also be noted that although FIG. 1 is based on data for water, this data closely approximates water-based beverages such as carbonated soft drinks and is generally used in the beverage industry.

FIG. 1A is an enlarged view of a portion of the saturation table of FIG. 1.

Figure 2:
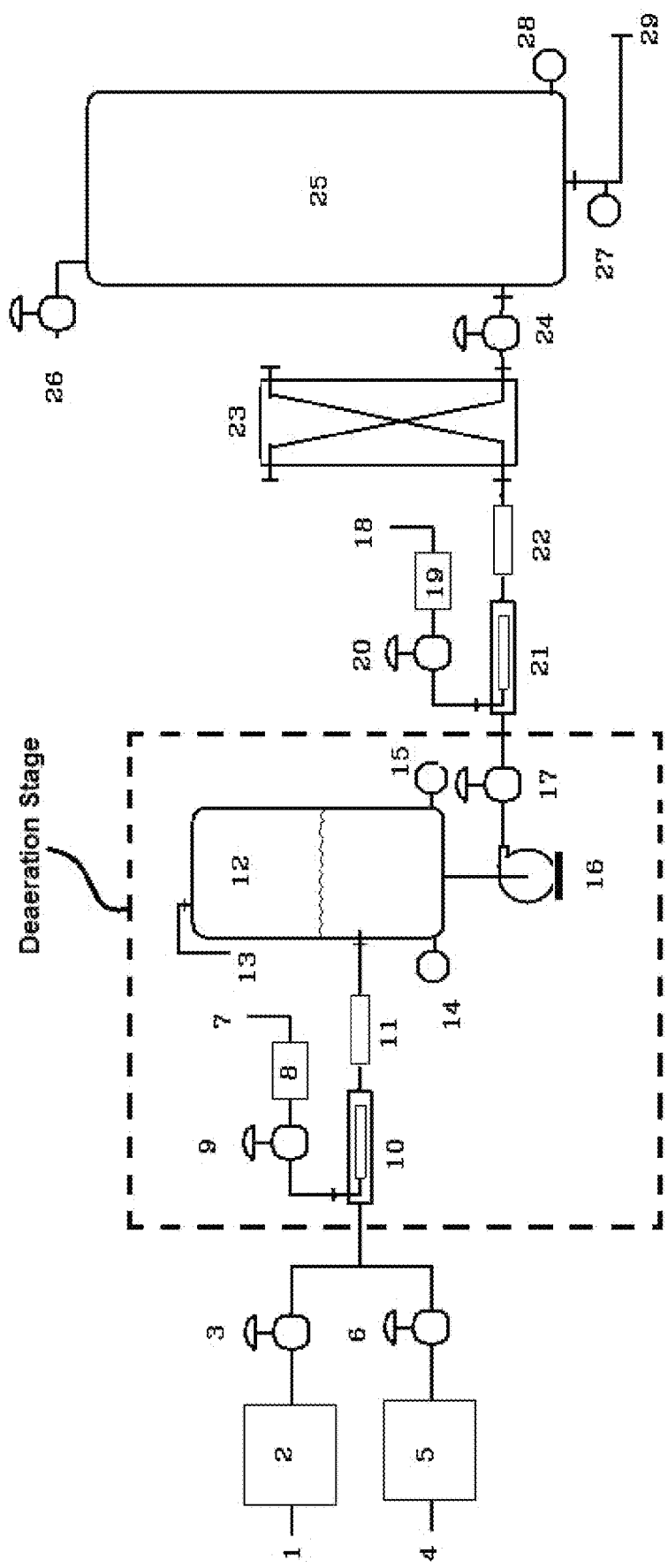
FIG. 2 depicts a schematic illustration of one embodiment of a deaeration system, as described herein, incorporated into a typical beverage production system.

The drawings are intended to illustrate rather than limit the scope of the present invention. Embodiments of the present invention may be carried out in ways not necessarily depicted in the drawings. Thus, the drawings are intended to merely aid in the explanation of the invention. Thus, the present invention is not limited to the precise arrangements shown in the drawings.

DETAILED DESCRIPTION

The following detailed description describes examples of embodiments of the invention solely for the purpose of enabling one of ordinary skill in the relevant art to make and use the invention. As such, the detailed description and illustration of these embodiments are purely illustrative in nature and are in no way intended to limit the scope of the invention, or its protection, in any manner. It should also be understood that the drawings are not to scale and in certain instances details have been omitted, which are not necessary for an understanding of the present invention.

Unless the context indicates otherwise, references herein to "bottling" and the like are intended to encompass not only the production of beverages packaged in bottles (glass or plastic), but also beverages packaged in metal cans and other types of containers—whether currently known or hereafter developed.

The present disclosure relates to controlling levels of dissolved gases in a beverage during the beverage production process. Embodiments of the present disclosure provide systems, apparatus and methods for producing beverages comprising water and syrup, particularly carbonated beverages, wherein the product blend (not just the process water) is deaearated prior to packaging. In some embodiments, oxygen (and nitrogen in the case of carbonated products) are removed from the beverage by pre-injecting into the total blended product (water and syrup) the desired gas type ($CO_2$ for carbonated products or $N_2$ for non-carbonated products) followed by introducing the gas-containing product blend into a vented atmospheric vessel such that the undesired gasses ($O_2$ and $N_2$, or $O_2$) are released from the product blend. The water does not need to be deaerated prior to being blended with syrup (although it can be, if desired).

In the case of carbonated beverages, not only are the levels oxygen and nitrogen significantly reduced compared to products in which only the process water has been deaerated, the deaerated product blend includes dissolved $CO_2$ at an intermediate carbonation level that can be precisely determined based solely on the temperature of the product blend during deaeration (e.g., the temperature within the vented atmospheric vessel or the temperature of the product blend entering or leaving the vented atmospheric vessel. The intermediate carbonation level is less than the predetermined final carbonation level for the bottled product. However, since this intermediate carbonation level can be determined, the amount of $CO_2$ necessary for injection into the product to meet the product specification can be readily determined.

Similarly, for non-carbonated beverages the retained amount of nitrogen in the product blend after deaeration can be readily determined based on the temperature of the product blend during deaeration.

Figure 1:
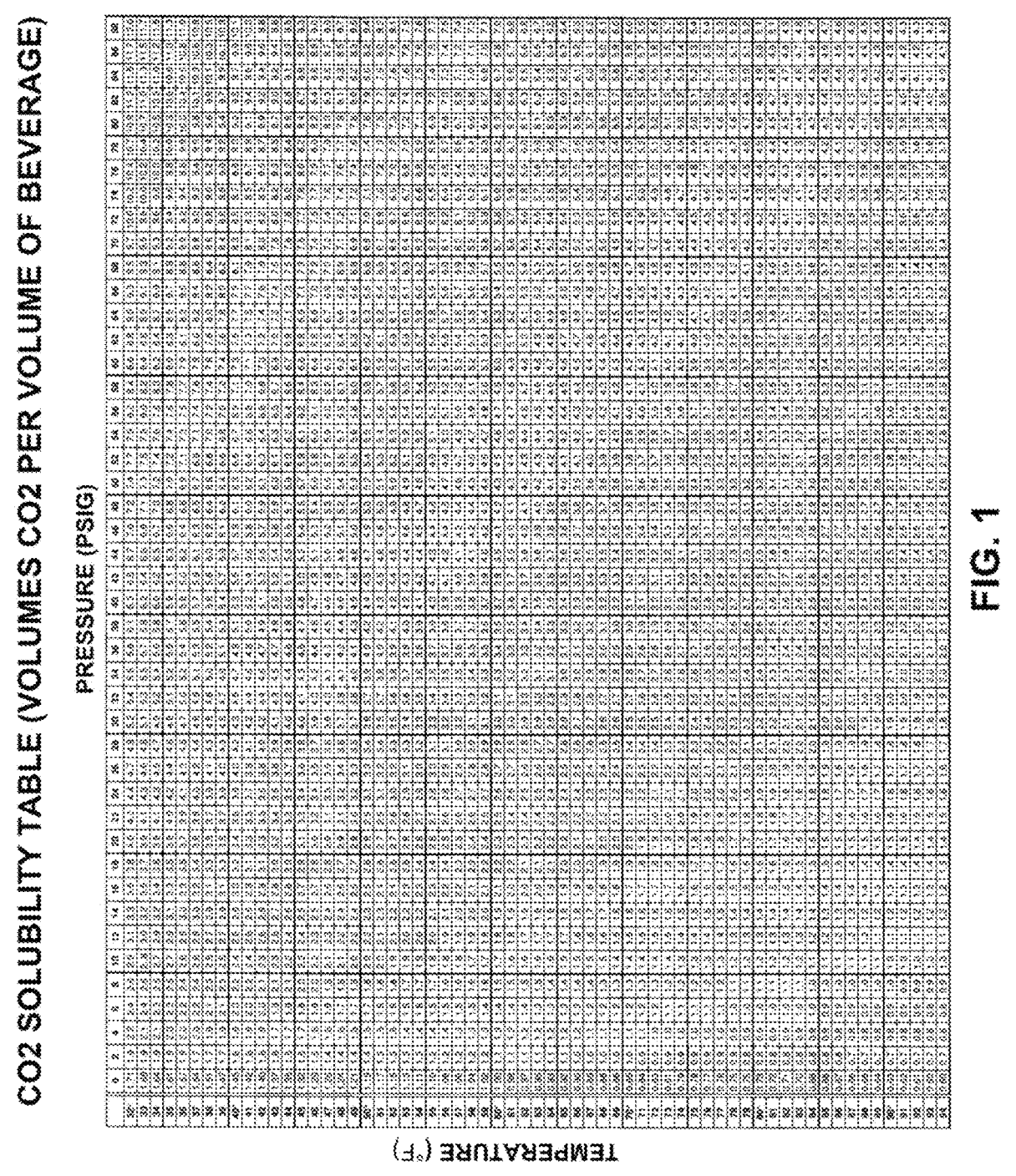

In one particular embodiment, the product blend—not just the process water—is sparged with $CO_2$ (i.e., $CO_2$ is injected into the product blend in the form of bubbles). The resulting $CO_2$-containing product blend is then introduced into a vented atmospheric vessel (referred to herein as a "deaerator tank"). Oxygen and nitrogen are released from the product blend within the vented vessel into the headspace, along with a portion of the $CO_2$ previously injected, and are vented therefrom (e.g., to the ambient atmosphere through a vent stack). Not only is the amount of dissolved $O_2$ and $N_2$ in the product blend significantly reduced, it has been surprisingly found that the product blend leaving the vented vessel will be fully saturated with $CO_2$. The amount of dissolved $CO_2$ in the product blend leaving the vented vessel can be readily determined using only the product blend temperature within the vented vessel and the predetermined $CO_2$ solubility in the product at atmospheric pressure and measured temperature (using the table of FIG. 1 or other predetermined data set or mathematical approximation of $CO_2$ solubility at atmospheric pressure for a given temperature). As a result, the amount of $CO_2$ needed in the subsequent carbonation stage to meet the product specification can be calculated. Thus, given only the temperature of the product blend during aeration and predetermined $CO_2$ solubility data applicable to the product blend, the precise amount of $CO_2$ needed to meet the carbonation specification can be metered into the product during final carbonation.

Embodiments described herein can also be used in the production of non-carbonated beverages by sparging the product blend with $N_2$ rather than $CO_2$ in order to reduce the amount of dissolved $O_2$ in the product blend prior to packaging. (For simplicity of description, this process is also referred to as deaeration, although it will be understood that only the amount of dissolved $O_2$ is reduced rather than $O_2$ and $N_2$.)

By reducing the amount of dissolved air (or dissolved $O_2$ in the case of non-carbonated beverages), embodiments of the systems and methods described herein can produce a more stable product. Lower amounts of dissolved air also allow for faster filling of containers (e.g., bottle or cans), and/or filling at product temperatures warmer than would otherwise be possible if the product has higher levels of dissolved air. Production losses due to spillage and short fills from product foaming during packaging are also diminished. In some instances, lower energy usage is accomplished, since less refrigeration is needed for bottling as well as less container warming following bottling (as is often required when filling at reduced temperatures, as necessitated by the presence of higher amounts of dissolved air). For many products, shelf-life is also increased due to the lower oxygen levels in the product, as well as reduced corrosion in the case of aluminum containers.

One embodiment of the present disclosure comprises a method of producing a carbonated beverage (e.g., a soft drink) having a predetermined final carbonation level, comprising the steps of:
  (a) introducing $CO_2$ (e.g., as bubbles, such as by sparging) into a flowing stream of a product blend comprising water and syrup, wherein that product blend includes dissolved oxygen, such that at least a portion of the introduced $CO_2$ is dissolved in the blend;
  (b) deaerating the $CO_2$-containing product blend by introducing the blend into a vented atmospheric vessel, the interior of which is at ambient pressure with a headspace is maintained above the product blend within the vessel, whereby a portion of the dissolved oxygen (as well as nitrogen) is released from the product blend and vented from the vessel;
  (c) withdrawing (e.g., pumping) the deaerated blend from the vessel, wherein the deaerated blend includes dissolved $CO_2$ at an intermediate carbonation level which is less than the predetermined final carbonation level; and
  (d) carbonating the deaerated blend to the final carbonation level downstream of the vented vessel to produce a carbonated beverage for subsequent packaging (e.g., filling bottles or cans). The above process is unique in that the $CO_2$-injected product is reduced to atmospheric pressure such that displaced gasses ($O_2$ and $N_2$) are released from the product, and the retained level of $CO_2$ is consistent with known saturation tables relative to temperature and atmospheric pressure. This known level of residual carbonation following deaeration allows the additional carbonation necessary to meet product specification to be added against a known volume of residual $CO_2$ in the product post-deaeration. The retained volume of $CO_2$ is subtracted from the final product carbonation specification in order to determine the amount of $CO_2$ needed for carbonation. For example, if the required carbonation level of the finished product is 3.7 volumes and the deaerated product contains 0.9 volumes of $CO_2$ based on a deaeration temperature of 66° F. (19° C., the final $CO_2$ injection necessary for carbonation will be 2.8 volumes.

The above-described method can be performed with conventional meter-based blending and carbonation systems, modified to include an additional $CO_2$ sparging arrangement and a vented atmospheric vessel between the blending and carbonation stages. A temperature sensor associated with the atmospheric vessel (or the product blend entering or leaving the vessel) provides a temperature signal that is used to control the amount of $CO_2$ injected into the product blend at the carbonation stage. It is not necessary to regulate or even monitor the pressure within the vented vessel (other than maintaining ambient, atmospheric pressure via an open vent). Nor is it necessary to monitor the amount of $CO_2$ dissolved in the product blend leaving the vented vessel. As a result, the deaeration process and system is a simple, inexpensive addition to existing bottling lines. Existing deaeration systems used to deaerate the process water prior to blending can also be eliminated, if desired. Alternatively, conventional deaeration of the process water can be employed prior to blending the process water with syrup, particularly if the process water has higher levels of $O_2$ or in the case of non-carbonated beverages to be sparged with $N_2$ rather than $CO_2$.

While the deaeration methods and systems will be described primarily in conjunction with the production of carbonated beverages, these methods and systems can also be used for non-carbonated beverages simply by using nitrogen in place of $CO_2$ for purposes of deaeration. Thus, $N_2$ is injected upstream of the vented atmospheric deaeration vessel, and the $N_2$ will cause $O_2$ to be expelled from the product blend within the deaeration vessel. The non-carbonated beverage is then bottled in the usual manner.

The methods and systems described herein employ $CO_2$ (or $N_2$ in some instances) sparging in order to remove dissolved oxygen and nitrogen (or oxygen alone when $N_2$ sparging is used). Carbon dioxide sparging and nitrogen sparging are well-known methods of removing dissolved air (or dissolved oxygen when nitrogen sparging is used). Sparging is based on Henry's Law, which states that the solubility of a gas in a liquid is proportional to the partial pressure of that gas in the gaseous atmosphere in contact with the liquid. The sparge gas ($CO_2$ or $N_2$) is introduced into an air-containing liquid in the form of bubbles. A difference in partial pressure is created between the sparge gas ($N_2$ or $CO_2$) and the gas ($O_2$, or $O_2$ and $N_2$) dissolved in the liquid. This difference in partial pressure causes the dissolved, undesirable gas ($O_2$, or $O_2$ and $N_2$) to be expelled from the liquid as the sparge gas is absorbed (i.e., dissolved) into the liquid. In the case of nitrogen sparging, even though nitrogen is less soluble than oxygen in water, the smaller size of the nitrogen molecules allows these molecules to drive out oxygen.

Although sparging can be accomplished simply by injecting bubbles of any size into an air-containing liquid, sparging is more efficient when the sparge gas is injected as fine bubbles. For this reason, spargers typically employ sintered metal sparge tubes for introducing the sparge gas through thousands of tiny pores in the tube, with the sparge tube positioned within a fluid passageway such as a section of pipe. The configuration of the sparge tubes, particularly pore size, will dictate the size of the sparge gas bubbles, with smaller bubbles providing greater gas/liquid contact area. The efficiency of sparging is also influenced by contact time between the gas and liquid, temperature, gas pressure, and the flow rate of gas in relation to the flow rate of liquid.

While a variety of different types of sparging devices can be used in the systems and methods described herein, in some embodiments one or more sparge tubes are used to create bubbles less than 30 microns in diameter, less than 10 microns in diameter, less than 5 microns in diameter, or even about 2 microns in diameter.

No sparging process can remove all of the undesirable gases from a liquid. In the systems and methods described herein, not all of the dissolved oxygen and nitrogen are removed from the product blend. However, embodiments of the methods and systems described herein are capable of, for example, reducing the levels of dissolved $O_2$ in a product blend from as high as 12 to 14 ppm (parts per million) to less than 500 ppb (parts per billion, i.e., 0.5 ppm), less than 200 ppb, less than 150 ppb, less than 100 ppb, less than 50 ppb, or even less than 30 ppb in the product blend prior to packaging, as desired or as necessary (e.g., to meet product specifications). In some embodiments wherein the product blend is a sugar-sweetened soft drink, the amount of dissolved oxygen in the product blend delivered to the filler is 25 to 50 ppb. In some embodiments wherein the product blend is a sugar-free soft drink, the amount of dissolved oxygen in the product blend delivered to the filler is 125 to 200 ppb. Levels of $N_2$ can also be reduced by similar amounts (or even more since $N_2$ is less soluble in the product blend than $O_2$). It should be noted that one ppm of dissolved $O_2$ or $N_2$ corresponds to one mg of dissolved gas per liter of product blend. Also, during packaging the product will typically pick-up some additional air, depending on the nature of the bottle filling process.

The amount of oxygen and nitrogen removed from the product blend, as well as how much remains following deaeration, will depend on a number of factors, including how much air is present prior to sparging, the temperature of the product blend during sparging, the amount of $CO_2$ injected during sparging and the period of time between sparging and the when the product blend enters the vented atmospheric tank (i.e., the contact time between the $CO_2$ and product blend prior to the discharge of air in the vented vessel). However, it has been discovered that the amount of dissolved carbon dioxide remaining in the product blend pumped from the vented atmospheric vessel is largely dependent only on the temperature of the product blend. Provided that the volume of $CO_2$ injected during sparging is sufficiently in excess of that needed for full saturation at atmospheric pressure for the given product blend temperature, and that the system is configured to provide sufficient contact time upstream to the vented vessel, the amount of dissolved $CO_2$ in the product blend leaving the vented vessel will be within 0.1 volumes of full saturation, or even within 0.05 volumes of full saturation for the measured product blend temperature (at atmospheric pressure).

The amount of $CO_2$ in excess of the saturation volume needed for sparging to ensure that the amount of dissolved $CO_2$ in the product blend leaving the vented vessel is within 0.1 volumes, or even within 0.05 volumes of full saturation will depend, in part, on the configuration of the sparging system. In addition, the amount of deaeration of the product blend leaving the vented vessel will also vary with the amount of $CO_2$ injected for sparging upstream of the vented vessel. In general, injecting more $CO_2$ will result in higher levels of deaeration. Thus, in some embodiments the amount of $CO_2$ injected during sparging should be an amount sufficient to ensure that the product blend leaving the vented vessel is within 0.1 volumes, or even within 0.05 volumes of full saturation, and that the product blend has been sufficiently deaerated to prevent excessive foaming during filling and (in some instances) to meet product specifications for dissolved $O_2$ and/or $N_2$.

For example, in some instances, particularly where the contact time (the time between the sparger and vented vessel for a given flow rate) is at least 1 to 2 seconds, injecting about twice the saturation volume of $CO_2$ per volume of product blend will be sufficient for the product blend leaving the vented vessel to be within about 0.05 volumes of saturation (at atmospheric pressure). In most instances, a contact time of about 1 to about 4 seconds is sufficient to ensure saturation.

While the amount of $CO_2$ injected during sparging will vary and the optimal level can be determined for each system and/or product, in general at least about 1.2 times the saturation volume at atmospheric temperature and process blend temperature, or at least about 1.5 times the saturation volume per volume of product blend is injected. At the upper end, the only limits are apparatus limitations and, to a lesser extent, consideration of the loss of $CO_2$ from the vented vessel when higher levels are injected during sparging. Accordingly, in some embodiments about 1.2 to about 1.5 times the saturation volume of $CO_2$ (for atmospheric pressure and product temperature) is injected during sparging. In other embodiments, particularly if there are higher levels of dissolved air in the product blend, about 2 to about 3.5 times saturation volume of $CO_2$ is injected, while in still further embodiments about 2 to about 3 times saturation volume of $CO_2$ is injected during sparging.

By way of a specific example, from FIG. 1A it can be seen that at atmospheric pressure and 40° F. (4° C.), full saturation of a water-based product blend at atmospheric pressure is about 1.45 volumes of $CO_2$ per volume of product. Therefore, if the product blend to be deaerated is at 40° F. (e.g., as measured in the vented vessel), in one embodiment between about 2 and about 3 times the saturation volume—i.e., about 3 to about 4.5 volumes of $CO_2$ per volume of product—is injected during sparging. If the product blend is, on the other hand, 70° F. (21° C.), full saturation of the product blend at atmospheric pressure is about 0.85 volumes of $CO_2$ per volume of product. Therefore, if the product blend to be aerated is at 70° F. (e.g., as measured in the vented vessel), in one embodiment between about 2 and about 3 times the saturation volume—i.e., about 1.75 to about 2.5 volumes of $CO_2$ per volume of product—is injected during sparging. Although less $CO_2$ injection for sparging is needed at the higher temperature, the product blend leaving the vented vessel will be within 0.1 volumes, or even about 0.05 volumes of full saturation (i.e., about 1.45 volumes at 40° F., and about 0.85 volumes at 70° F.). In both instances the amount of dissolved $O_2$ remaining in the product blend leaving the vented vessel will be at acceptable levels (e.g., less than 200 ppb). If an even lower level of dissolved $O_2$ is desired, the amount of $CO_2$ injected for sparging can be increased and/or the contact time between the sparger and vented vessel increased.

The product blend temperature during sparging and deaeration is largely a function of the temperature of the process water, and can vary seasonally. Typical process water temperatures range from about 40° F. to about 90° F. (32° C.). One additional advantage of the systems and methods described herein is that the product temperature for deaeration does not need to be controlled—only measured. The deaeration system and methods can function effectively at any of these temperatures. However, in some embodiments the temperature of the product blend during deaeration is at least about 50° F. (10° C.)—e.g., about 50° F. to about 90° F. Cooler product temperatures can require the injection of more $CO_2$ during sparging in order to achieve desired levels of air in the product, as the lower temperature allows some $O_2$ to be reabsorbed. In still further embodiments, the temperature of the product blend during deaeration is about 60° F. (16° C.) to about 85° F. (29° C.). In other embodiments, the temperature of the product blend during deaeration is about 70° F. (21° C.) to about 85° F. (29° C.).

Assuming the liquid pressure during sparging is not too high, the product blend will quickly become saturated with $CO_2$, with excess $CO_2$ remaining as bubbles (i.e., not dissolved) in the flowing product blend. When the gas-containing product blend is introduced into the vented atmospheric vessel, these bubbles will not only rise to the surface of the liquid in the vented vessel, but will also strip additional oxygen and nitrogen from the product blend. Thus, by injecting an excess of $CO_2$ during sparging, not only has it been found that the product leaving the vented vessel will be at full $CO_2$ saturation, the bubbles resulting from the excess $CO_2$ injection results in even greater deaeration. While a simple vented tank can be used for the vented deaeration vessel, as further described herein the vessel can include additional internal features that facilitate gas separation (i.e., reduce the amount of entrained $O_2$ and $N_2$ in the product blend leaving the vented vessel) and/or limit foam production in the vented vessel.

The liquid pressure during sparging is not critical. In fact, the liquid pressure (i.e., the pressure of the product blend) can be as low as 5 to 15 psig—just enough to overcome frictional losses, allow the use of an inline static mixer to improve deaeration and inject the product blend into the vented vessel. In some instances the product blend is injected into the vented vessel at or slightly above the liquid level therein (e.g., less than 2 feet, less than one foot, or about 4 to 6 inches above the liquid level). In other instances the product blend is injected into the vented vessel at or slightly below the liquid level therein (e.g., less than 2 feet, less than one foot, or about 4 to 6 inches below the liquid level). The $CO_2$ pressure for sparging is also not critical, and can be, for example, about 50 psi above the liquid product blend pressure at the sparger.

In terms of the actual volumes of $CO_2$ injected for sparging, in some embodiments about 0.8 to about 5 volumes of $CO_2$ per volume of product blend are injected during sparging (i.e., between blending and carbonation) for purposes of deaeration, depending on product blend temperature, levels of dissolved air and desired level of deaeration. In other embodiments, about 1.5 to about 4 volumes of $CO_2$ per volume of product blend is injected during sparging between blending and carbonation for purposes of deaeration. And in still other embodiments about 0.8 to about 1.5 volumes of $CO_2$ per volume of product blend are injected during sparging between blending and carbonation for purposes of deaeration.

Despite an excess of injected $CO_2$, the deaerated product blend discharged from the vented atmospheric vessel will be between about 0.6 and about 1.45 volumes of $CO_2$ per volume of product blend, with the exact amount determined almost exclusively on the basis of the temperature of the product blend within the vented vessel (e.g., within 0.1 volumes, or within 0.05 volumes compared to the full saturation level at atmospheric pressure, as determined, for example, from FIG. 1). This allows for precise control of the amount of $CO_2$ needed for final carbonation simply by monitoring the deaeration temperature. While final carbonation specifications vary from product to product, in general the intermediate carbonation level following deaeration will be about 2 to about 4 volumes of $CO_2$ less than the final carbonation level.

FIG. 2 is a schematic illustration of one embodiment of a system for producing carbonated beverage for subsequent filling, wherein a Deaeration Stage has been incorporated therein. Although not shown in FIG. 2, the system will further include various other conventional components used in beverage blending and carbonation systems, particularly meter-based control features that control blending and carbonation based on mass flow metering and the like. Thus, the system of FIG. 2 will further include, for example, one or more controllers for storing and retrieving product specification data (i.e., product recipes), as well as receiving signals from various sensors and other devices and controlling various actuators, and other devices in accordance with stored instructions and acquired data.

By way of example, the Deaeration Stage can be incorporated into the beverage blending and carbonation methods and systems described, for example, in U.S. Pat. Nos. 5,068,116, 5,314,703, 5,537,914, 5,552,171, and 5,656,313 (all of which are incorporated by reference herein). Such methods and systems, available commercially from Bevcorp LLC as its Micro-Blend™ System, provide precision blending of two or more streams to an accuracy of +/−0.2% of target with repeatability of +/−0.001. The Micro-Blend™ System uses Coriolis mass flow meters and calculates volumetric mass flows based on the absolute density of the syrup and temperature of the process water. Gas flow rates ($CO_2$ or $N_2$) for deaeration can be calculated and controlled using Coriolis mass flow meters to provide accuracies of within 1%. For example, as discussed previously, the control system can calculate and control the appropriate volume of $CO_2$ to inject for deaeration based on the temperature of the product blend and the product blend flow rate, thereby ensuring full saturation of the product blend leaving the Deaeration Stage as well as the desired levels of dissolved $O_2$ and $N_2$.

In the system of FIG. 2, a supply of syrup (1) as well as a supply of process water (2) are provided. The latter may be deaearated in the conventional manner prior to blending with the syrup, particularly if the level of dissolved $O_2$ in the process water is high (e.g., above 2 to 3 ppm $O_2$). Deaeration of the process water prior to blending with the syrup is also desirable in some instances when N2 is used for deaeration of the product blend in the Deaeration Stage in order to reduce foaming in the Deaeration Stage. However, in most instances such an additional deaeration step is not necessary given the product blend deaeration provided by Deaeration Stage of the system shown in FIG. 2.

The supply of syrup (1) is in fluid communication with a syrup mass flow meter (2) and the flow of syrup is controlled by a syrup flow control valve (3) based on the product recipe and control signals received from the controller. Similarly, the supply of process water (4) is in fluid communication with a water mass flow meter (5) and the flow of process water is controlled by a water flow control valve (6) based on the product recipe and control signals received from the controller. By way of specific example, liquid mass flow can be controlled using variable frequency drives (or VFD's) to control the liquid pumps. Gas flow can be controlled using flow control valves.

The combined flow of syrup and process water, i.e., the process blend, is supplied to a sparger (10) having a sparge pipe located therein. A source (7) of sparge gas ($CO_2$ or $N_2$, depending on the product being produced) is in fluid communication with a gas mass flow meter (8) and the flow of sparge gas into the sparge pipe is controlled by a gas control valve (9). The gas flow rate is determined by the desired level of deaeration and the product blend temperature, based on the product recipe and control signals received from the controller. The product blend having the sparge gas therein (typically both dissolved and as bubbles) is supplied to a static mixer (11) (e.g., a static tube mixer) or other mixing device, and is thereafter introduced into a vented atmospheric deaerator tank (12). Tank (12) operates at atmospheric pressure and is vented thru an open vent line (13). The excess injection gas and displaced $O_2$ and $N_2$ are removed via the vent line (13), typically to the ambient, thereby significantly reducing the amount of $O_2$ and $N_2$ in the product blend (or reducing the amount of $O_2$ when $N_2$ is used instead of $CO_2$ for purposes of deaeration, i.e., deoxygenation.

As seen in FIG. 2, the product blend inlet is located below the operating level within the tank (12), with the liquid level in tank (12) controlled accordingly, in order to reduce agitation. The deaeration tank level is measured by a level sensor (15) and the system controller controls the liquid level in the tank (12) so as to maintain the liquid level above the product blend inlet (e.g., a liquid level approximately 40-60% of the height of the tank, or about 50% of the height of the tank). The liquid level is maintained via a deaerator level control valve (17), and a deaerator pump (16) delivers the deaerated product blend to the final carbonation step. The temperature of the product blend within tank (12) is monitored by a temperature sensor (14). A temperature signal from the sensor (14) is supplied to the controller, and is used to determine the amount of dissolved $CO_2$ retained in the product blend leaving the tank (12). As noted in FIG. 2, the deaerated product blend is discharged from or adjacent to the bottom of tank (12), spaced away from the product blend inlet a sufficient amount so as to provide sufficient residence time within tank (12) for deaeration, and to provide sufficient movement within tank (12) so that there are no dead zones (i.e., areas of liquid that are stagnant). The agitation within tank (12) also ensures that the excess $CO_2$ is released from the product blend. If desired, a mixer or other device for increasing agitation and movement can be added to tank (12) in order to further ensure that the product blend leaving the tank is within 0.1 or 0.05 volumes of saturation ($CO_2$ or $N_2$).

In one embodiment, the vented atmospheric vessel is an atmospheric tank (made of, e.g., stainless steel) having a capacity sufficient to provide an average residence time of product within the tank of at least about 30 seconds, at least about 45 seconds, or at least about 60 seconds. In some embodiments, the average residence time is less than about 240 seconds, less than about 120 seconds, or less than about 90 seconds. In one particular embodiment, the average residence time is about 45 to about 75 seconds, and the liquid level within the tank is maintained at about 40% to about 60% of capacity.

For carbonation to the predetermined final carbonation level (as dictated by the product recipe), a source (18) of $CO_2$ (which may the same source as source (7)) is in fluid communication with a gas mass flow meter (19) and the flow of $CO_2$ into a carbonator, such as carbonation sparger (21) comprising a sparge pipe, is controlled by a gas control valve (20). The controller determines the necessary flow of $CO_2$ into the carbonation sparger based on the desired level of final carbonation (based on the product recipe), as well as the carbonation level of the product blend pumped from the deaeration tank (12) predicted on the basis of product blend temperature within tank (12). The product blend having the final level of CO$_2$ dissolved therein is supplied to a static mixer (22) (e.g., a static tube mixer), and thereafter delivered to a product chiller (23) for chilling the carbonated product to the product specification (i.e., each product often has a specified product temperature that has been determined to be optimal for filling purposes). By product recipe the chilled carbonated product flows to a back pressure valve (24) that ensures adequate pressure for complete CO$_2$ saturation of the product blend to meet the product specification. Typically, the back pressure valve ensures a liquid pressure of about 2 to about 5 times the saturation pressure for a given product fill temperature and carbonation level, per product specifications (e.g. 80 to 100 psig).

The carbonated product blend is then delivered to a product storage tank (25), below the operating level to reduce agitation. The level is measured by the product tank level sensor (28). Pressure in the product tank (25) is controlled by a pressure controller (26), based on product specification. For example, since the filling system operates at the same pressure as the product tank, products that are less volatile can be stored (and filled) at lower pressures. Product temperature is measured by temperature sensor (27). When filling is to commence, the carbonated product flows from the product tank (25) to a container fill (not shown) through outlet line (29).

As mentioned previously, the retained level of CO$_2$ in the product blend supplied to the final carbonation sparger is fully saturated relative to product temperature at atmospheric pressure. Accordingly, the retained volume of CO$_2$ is subtracted from the final product carbonation specification. For example, if the required carbonation in the final product is 3.7 volumes and the deaerated product retains 0.9 volumes of CO$_2$ based on the deaeration temperature, the final CO$_2$ injection for carbonation will be 2.8 volumes. By way of one specific example, the following equations can be used to determine the required amount of CO$_2$ needed to be injected for final carbonation:

GasVol$_{dissolved}$=final carbonation level, per product specification

GasVolume$_{pre-inject}$=retained CO$_2$ volumes of product blend (at 0 psig) calculated according to the following 3rd degree polynomial derived from FIG. 1:

Gas Volume-pre-inject=3.288−0.06613*(Temp $F$)+0.0005850*(Temp $F$)$^2$−0.000001976*(Temp $F$)$^3$ Gas Offset=the correction for carbonation due to gains or losses due to the filling process (based on lab results)

Liquid$_{cfm}$=Total $GPM$*0.13368

Gas$_{cfm}$ is the gas flow setpoint for final carbonation:

Gas$_{cfm}$=(GasVol$_{dissolved}$+Gas Offset)−GasVolume$_{pre-inject}$/Liquid$_{cfm}$ Since the final control will be in lbs/min, Gas$_{cfm}$, is converted into lbs/min as follows:

GaS$_{Lbs/Min}$=Gas$_{cfm}$*0.11366

Of course, various other mathematical correlations can be used in the same or similar manner.

While the deaerator tank can comprise a simple vented vessel having suitable connections for introducing the product blend, venting gases and removing deaerated product, it has also been found that the vessel can include additional internal features that facilitate gas separation in order to reduce the amount of entrained O$_2$ and N$_2$ in the product blend leaving the vessel and/or to limit foam production in the vented vessel.

Figure 3:
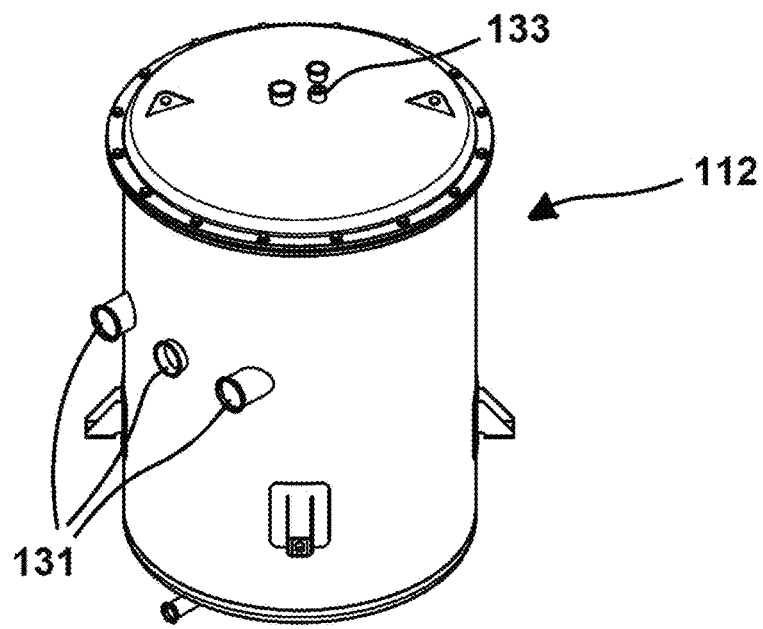
FIGS. 3 and 4 depict schematic illustrations of one embodiment of a deaerator tank for use in the deaeration systems described herein.
Figure 4:
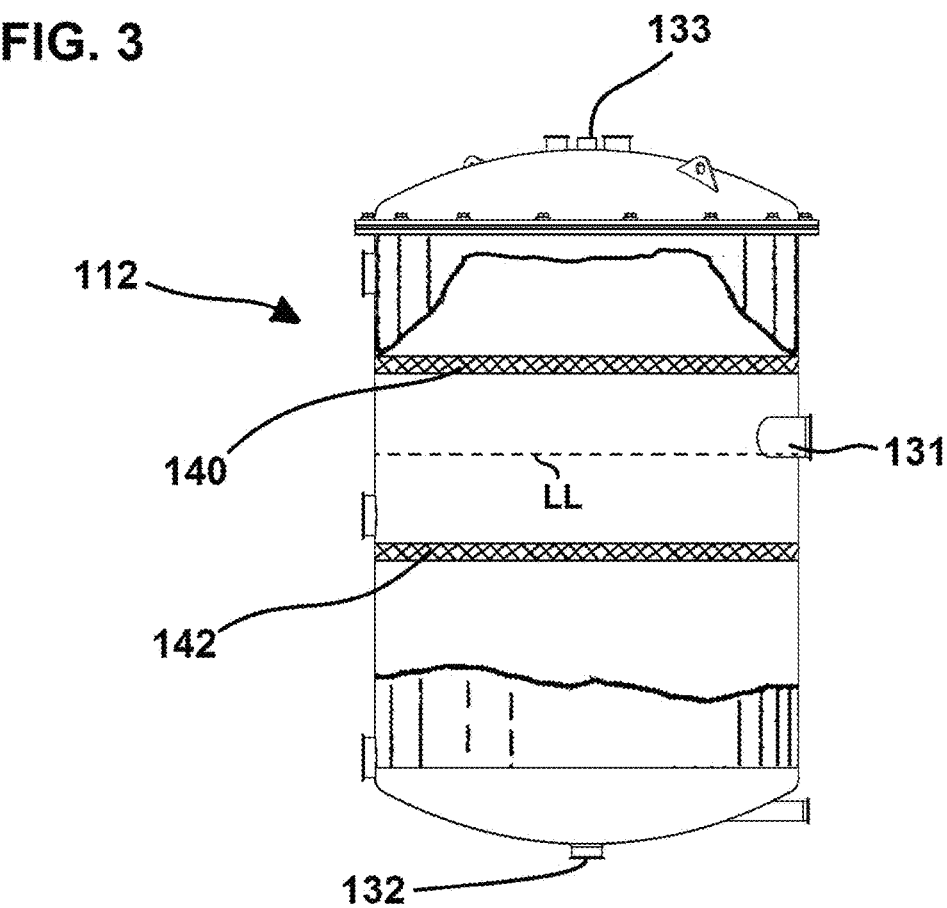

FIG. 3 is a schematic elevational view of a generally cylindrical deaerator tank (112), and FIG. 4 is a partial cross-sectional view of the deaerator tank (112). Tank (112) once again operates at atmospheric pressure, and includes an atmospheric vent (133). The product blend enters tank (112) through three inlets (131) in order to reduce the flow velocity. The inlets (131) are located at the same level, and are spaced apart about a portion of the circumference of the tank. During operation, the tank (112) is operated such that the liquid level (LL) is at or slightly below the height of the inlets (131). An outlet (132) is provided at the bottom of the tank (112) for removing the deaerated product blend for bottling.

In some instances, particularly when bottling low calorie (i.e., "diet") beverages containing artificial sweeteners and/or with large fluid throughputs, foam can be produced in the upper portion of the deaerator tank and microscopic oxygen bubbles are entrained in the liquid leaving the bottom of the deaerator tank. While such problems can be addressed by using a larger deaerator tank, the embodiment of FIGS. 3 and 4 includes a coalescer (142) in the form of a pad, pack or plate (or series of plates), as well as a foam breaker (140) in the form of a pad, pack or plate (or series of plates).

The foam breaker (140) is located above the liquid level (LL). In one embodiment, the foam breaker (140) comprises a series of corrugated metal plates that break-up bubbles that pass though the plates, allowing oxygen and nitrogen to be vented from the tank (112). Any of a variety of alternative foam breakers can be employed for this purpose, such as various types of plates (also referred to as trays), pads, packing (also referred to as a pack), and combinations of the foregoing that are configured to break gas bubbles in a foam.

The coalescer (142) is located below the surface of the liquid. In one embodiment, the coalescer (142) comprises a mesh tray that allows smaller gas bubbles in the liquid to form larger bubbles that separate more easily from the liquid for subsequent venting from the tank (112). Any of a variety of alternative coalescers can be employed for this purpose, such as various types of plates (also referred to as trays), pads, packing (also referred to as a pack), and combinations of the foregoing that are configured to coalesce small gas bubbles into larger bubbles that can more readily escape from the liquid within the tank (112).

By employing both a foam breaker (140) and a coalescer (142), the deaerator tank (112) can be made smaller and/or have improved deaeration. It will also be understood that the deaerator tank can include a foam breaker only, or a coalescer only. Likewise, the deaerator tank can include more than one foam breaker only and/or more than one coalescer.

Finally, while conventional bottling equipment and methods can be used for bottling the deaerated product blend produced using the systems and methods described herein, in order to maintain low levels of O$_2$ and N$_2$ in the packaged product, bottling should be performed in a manner that avoids the re-introduction of air into the container (e.g., a bottle or can). This may be accomplished, for example, by evacuating air from the product container immediately prior to filling (e.g., using a CO$_2$ purge). Alternatively, the filling equipment can be designed such that air is not introduced (or only a small amount of air is introduced into the container during filling and capping/can seaming.

While various embodiments have been described in detail above, it will be understood that the components, features and configurations, as well as the methods of manufacturing the devices and methods described herein are not limited to the specific embodiments described herein. Additional features of the invention will become apparent to those skilled in the art upon consideration of the description. Modifications may be made without departing from the spirit and scope of the invention. The methods and systems described herein can be used for oxygen and nitrogen removal from a variety of beverages, including juices, alcoholic beverages, soft drinks (aka sodas), flavored waters, energy drinks, athletic drinks, etc.

What is claimed is:

1. A method of producing a carbonated beverage comprising a blend of water and syrup having a predetermined final carbonation level, comprising the steps of:
   (a) introducing $CO_2$ into a flowing stream of a liquid product blend comprising water, syrup and dissolved oxygen, such that $CO_2$ is dissolved in said product blend;
   (b) deaerating the $CO_2$-containing liquid product blend by introducing the liquid product blend into a vented atmospheric vessel, the interior of which is at ambient pressure with a headspace maintained above the liquid within the vessel, whereby dissolved oxygen is released from the product blend and vented from the vessel;
   (c) pumping the product blend from the vessel, wherein the product blend includes dissolved $CO_2$ at an intermediate carbonation level less than said final carbonation level; and
   (d) carbonating the product blend to said final carbonation level downstream of the vented vessel to produce the carbonated beverage for subsequent packaging.

2. The method of claim 1, wherein said intermediate carbonation level is between about 2 and about 4 volumes of $CO_2$ less than said final carbonation level.

3. The method of claim 1, wherein said intermediate carbonation level is between about 0.6 and about 1.45 volumes of $CO_2$ per volume of product blend.

4. The method of claim 3, wherein $CO_2$ is introduced into said flowing stream of liquid product blend such that not all of the introduced $CO_2$ is dissolved in said product blend prior to the deaerating step.

5. The method of claim 3, further comprising the steps of measuring the temperature of the product blend during deaeration, and adjusting the amount of $CO_2$ introduced during the carbonating step based upon said temperature of the product blend during deaeration.

6. The method of claim 5, wherein the step of measuring the temperature of the product blend during deaeration comprises measuring the temperature within the vented atmospheric vessel, measuring the temperature of the product blend introduced into the vented atmospheric vessel, or measuring the temperature of the product blend pumped from the vented atmospheric vessel.

7. The method of claim 4, wherein said deaerating step reduces dissolved oxygen in the product blend to less than 200 ppb.

8. The method of claim 5, wherein said deaerating step reduces dissolved oxygen in the product blend to less than 100 ppb.

9. The method of claim 5, wherein during said deaerating step, released oxygen and a portion of $CO_2$ injected upstream of the vessel is vented from the vessel.

10. The method of claim 4, wherein the temperature of the product blend during deaeration and during the step of introducing $CO_2$ is between about 50° F. and about 90° F.

11. The method of claim 10 wherein the $CO_2$ is injected in the form of bubbles having a size of less than 5 microns in diameter.

12. The method of claim 5, wherein the $CO_2$-containing product blend is introduced into the vented atmospheric vessel at a height within about one foot of the height of the surface of the liquid within the vessel, and $CO_2$ is injected sufficiently upstream of the vented vessel so that a contact time of at least one second is provided.

13. The method of claim 5, wherein the vented atmospheric vessel includes both a coalescer and a foam breaker, and further wherein the level of the liquid product blend within the vessel is maintained above the coalescer and below the foam breaker.

14. The method of claim 5, wherein the amount of dissolved $CO_2$ in the product blend pumped from the vented vessel is within 0.1 volumes of full $CO_2$ saturation at atmospheric pressure at the temperature of the product blend during deaeration.

15. The method of claim 14, wherein $CO_2$ is introduced into said flowing stream of liquid product blend such that not all of the introduced $CO_2$ is dissolved in said product blend prior to the deaerating step.

16. The method of claim 14, wherein the step of adjusting the amount of $CO_2$ introduced during the carbonating step comprises determining the amount of dissolved $CO_2$ retained in the product blend pumped from the vented vessel prior to said carbonating step as the fully saturated level of $CO_2$ at atmospheric pressure at said temperature of the product blend during deaeration, and adjusting the amount of $CO_2$ injected into the product blend during said carbonating step so as to compensate for the dissolved $CO_2$ retained in the product blend pumped from the vented vessel.

17. The method of claim 1, wherein the product blend further comprises dissolved nitrogen, and said deaerating step reduces dissolved nitrogen.

18. The method of claim 1, wherein the vented atmospheric vessel further includes at least one of a coalescer and a foam breaker, and further wherein the level of the liquid product blend within the vessel is maintained above the coalescer and/or below the foam breaker.

19. The method of claim 1, wherein $CO_2$ is introduced into said flowing stream of liquid product blend such that not all of the introduced $CO_2$ is dissolved in said product blend prior to the deaerating step.

* * * * *